Feb. 26, 1952  E. GRETENER ET AL  2,586,941
MECHANICAL TORQUE AMPLIFIER
Filed March 4, 1948
2 SHEETS—SHEET 1
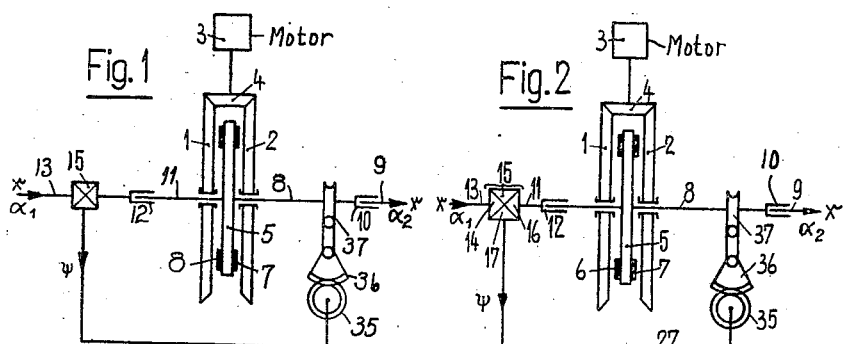
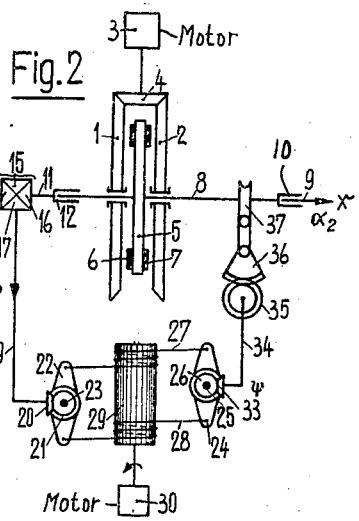
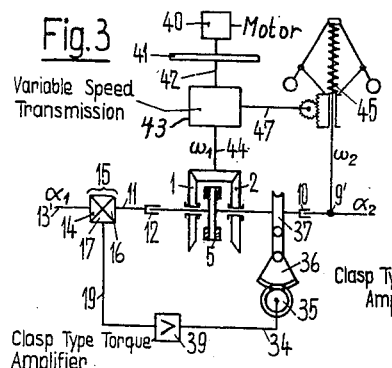
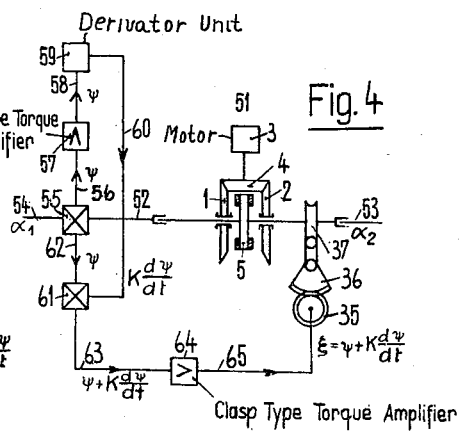
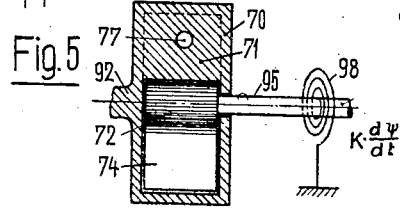
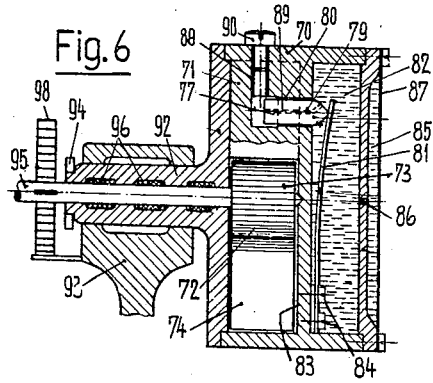
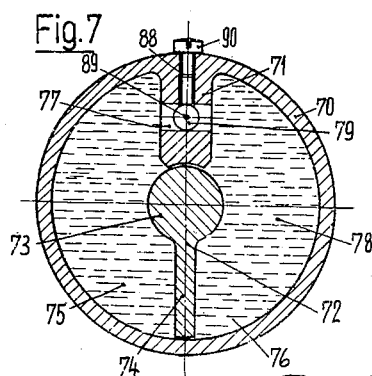
INVENTORS
Edgar Gretener
Kurt Ehrat
BY Pierce, Scheffler & Parker
ATTORNEYS Feb. 26, 1952     E. GRETENER ET AL     2,586,941
MECHANICAL TORQUE AMPLIFIER
Filed March 4, 1948     2 SHEETS—SHEET 2
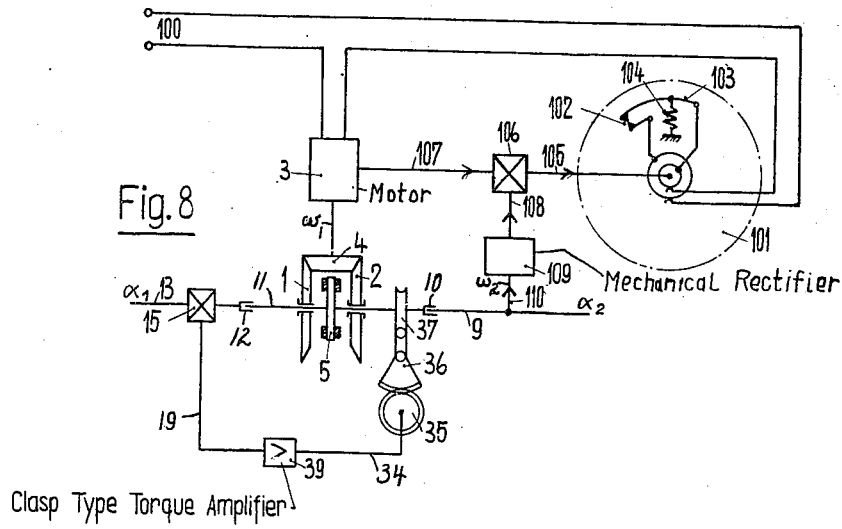
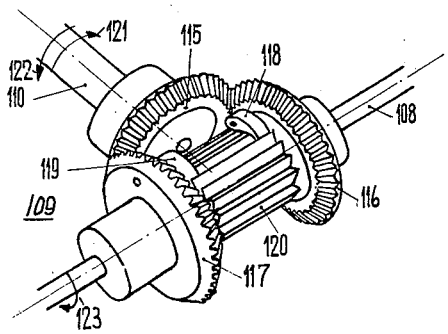

Patented Feb. 26, 1952

2,586,941

UNITED STATES PATENT OFFICE 2,586,941

MECHANICAL TORQUE AMPLIFIER

Edgar Gretener, Zurich, and Kurt Ehrat, Baden, Switzerland; said Ehrat assignor to said Gretener Application March 4, 1948, Serial No. 13,063
In Switzerland March 5, 1947

12 Claims. (Cl. 74—388)

1

This invention relates generally to torque amplifiers and in particular to those of the mechanical type in which angular rotation of an input shaft requiring a relatively low order of torque effects equal angular rotation of an output shaft but with a greatly increased torque characteristic.

In one type of amplifier to which this invention can be applied, the power for driving the output shaft is supplied by a pair of juxtaposed and coaxial discs which are driven in opposite directions of rotation from the power output shaft of a prime mover such as a gas engine, electric motor and the like. The output shaft is journalled for rotation on the same axis as that of the driving discs and carries a friction type clutching disc keyed or otherwise secured thereto and located intermediate the driving discs. The clutching disc is shiftable in either direction along its axis and hence can be brought into frictional clutching engagement with either one of the driving discs. Since the latter rotate in opposite directions, the output shaft, when clutched to one or the other of the driving discs through the clutching disc, will rotate in one direction or the other at a speed determined by the torque between the two discs which in turn is determined by the pressure therebetween.

The shift in the clutching disc and the pressure thereof on one or the other of the driving discs is derived from the output of a differential device, such output being a function of the sense and magnitude of the angular speed of the input shaft which constitutes one input to the differential. A second input to the differential which is derived from and varies with the speed of the output shaft serves as the "follow-up" component of the torque amplifier system and functions to limit the pressure of the clutching discs on the driving disc to such a value that the speed of the output shaft will be just equal to the speed of the input shaft.

Torque amplifiers of the type described using a pair of alternatively used friction clutches have been found to operate quite satisfactorily provided the torque available for rotating the input shaft is not too low. This is due to the fact that the power for applying the clutching pressure is derived directly from the output of the differential which in turn must be powered by the input control torque. In other words, the control torque available to the input shaft must be sufficient to supply whatever clutching pressure is required between the friction clutching disc and the driving discs to maintain the output shaft at the desired speed.

One of the objects of the present invention is to provide an improved arrangement for reducing the torque required at the input shaft to produce the necessary clutching pressure thereby making it possible to transmit a large amount of output torque from a very small input torque. Specifically, the improved result is obtained by interposing an auxiliary mechanical torque amplifier between the output of the differential and the shifter mechanism for the clutching disc; an auxiliary amplifier of the "clasping" or "windlass" type is preferred and will be described in further detail hereinafter.

Another object is to provide for automatically varying the speed of the power supply components of a mechanical torque amplifier in accordance with variations in speed of the torque output shaft to thereby keep the friction and windage losses of the former at a minimum value.

A more specific object is to provide a variable speed transmission between the power source and the driving discs of a mechanical torque amplifier, the transmission ratio being varied automatically and in the same sense as variations in the speed of the output shaft for minimizing power losses in the discs.

A further object is to provide an improved arrangement for supplying the mechanical power input to the driving elements of a mechanical torque amplifier, the power being furnished by a prime mover such as an electric or petrol motor, the speed of which is varied in accordance with the speed of the output shaft of the amplifier.

A further object is to reduce the hunting effect between the input and output shafts of a mechanical torque amplifier by introducing a control factor which varies as the derivative of the instantaneous difference in angular speeds between the input and output shafts; and to further provide an improved device of the fluid type for deriving the derivative factor.

The foregoing as well as other objects and advantages afforded by the invention will become more apparent from the following detailed verbal description and accompanying drawings which illustrate preferred constructional embodiments.

In the drawings, Fig. 1 is a somewhat diagrammatic view in plan showing a torque amplifier of generally conventional construction; and Fig. 2 shows the Fig. 1 construction modified in accordance with one of the features of the present invention to incorporate an auxiliary torque amplifier of the "clasping" type for applying the clutching pressure to the driving discs, thereby enabling the output shaft to be operated at a very high torque amplification factor from a very low torque input;

Fig. 3 is another diagrammatic view in plan illustrating the improved arrangement for automatically varying the speed of the driving elements of the torque amplifier through a variable-speed transmission device in accordance with speed variations in the power output shaft of the amplifier;

Fig. 4 is a diagrammatic view in plan of the improved construction for introducing a derivative factor into the control of a mechanical torque amplifier to reduce the hunting effect between the input and output shafts;

Fig. 5 is a combined constructional and schematic view illustrating the operating principles of a preferred form of mechanical speed derivator device used in the Fig. 4 system;

Fig. 6 is a view in vertical longitudinal section through the mechanical speed derivator of Fig. 5;

Fig. 7 is a transverse section taken on line 6—6 of Fig. 6;

Fig. 8 is a diagrammatic view in plan illustrating another improved arrangement for automatically varying the speed of the driving elements of the torque amplifier; and Fig. 9 is a perspective view of a mechanical rectifying device employed in the embodiment shown by Fig. 8.

Referring now to the drawings, and in particular to Fig. 2, the improved mechanical torque amplifier is seen to be composed of a pair of axially spaced driving discs 1, 2 journalled for rotation about a horizontal axis x—x and which are driven at constant speed in opposite directions of rotation from a motor 3 through a common pinion 4 which meshes with gear teeth formed at the periphery of each disc. Also mounted for rotation on axis x—x and located between the two driving discs is a clutching disc 5 having annular friction rings 6, 7 secured to the opposite faces thereof. Disc 5 is keyed or otherwise secured in non-rotative relation upon an axle 8 which is suitably journalled on axis x—x and also arranged for displacement along its axis in either direction from the central position showing in the drawing to cause clutch disc 5 to bear against one or the other of the driving discs. In order to assure an accurate torque transmission factor, the friction coefficient of the two clutches formed by disc 5 and the two driving discs 1, 2 should remain substantially constant. This can be attained by making the friction rings 6, 7 of graphite and using metallic driving discs, the inner contact faces of which are ground and highly polished.

Shaft 9 arranged co-axially with axle 8 and joined at one end thereto by a sliding type coupling 10 constitutes the output shaft of the torque amplifier. Another shaft 11, co-axial with axle 8 and connected to the other end thereof by a sliding type coupling 12 constitutes the "follow-up" element of the amplifier.

The low order torque input is applied to shaft 13 which is connected to drive one of the crown gears 14 of a differential 15. The other crown gear 16 of this differential is driven by shaft 11, and the planet pinions 17 of the differential are journalled in bearings forming part of the cage which includes also a ring gear that accordingly is turned through an angle in one direction or the other dependent upon the sense and magnitude of the angular speed of the input shaft 13.

The output of differential 15 measured in terms of angular displacement of the cage and ring gear from a neutral position is taken from the gear and transmitted through shafting 19 to a pinion 20 that is meshed with a crown gear 21 which is arranged to rotate a double ended control arm 22 about its center 23. Another double ended control arm 24 rotatable about its center 25, and having a crown gear 26 secured thereto concentric with center 25, is arranged generally parallel with arm 22, and corresponding opposite ends of the arms are connected by ropes 27, 28 which are wound for a few turns in the same direction about a friction drum 29 located between the arms. The drum is suitably journalled for rotation on its axis and is driven by motor 30. A pinion 33 is meshed with crown gear 26 and rotation of the former is transmitted over shafting 34 to a pinion 35 meshed with sector gear 36 that is connected to drive a yoke type axle shifting device 37 coupled to axle 8 for shifting the latter axially in either direction.

The two arms 22, 24 together with the ropes 27, 28 and friction drum 29 constitute an auxiliary mechanical torque amplifier that may be termed a "clasping amplifier," and which is used for transforming angular displacement of the differential cage and associated ring gear into axial displacement of axle 8 and hence friction disc 5.

The improved torque amplifier operates as follows: Let it be assumed that input shaft 13 is at rest and the driving discs 1 and 2 rotating at rated speed. If now, shaft 13 is rotated at an angular speed $a_1$ from a low torque source, crown gear 14 of differential 15 will rotate at a like speed. At this instant the other crown gear 16 of this differential will be at rest. Hence the planet pinions 17 and cage will begin to turn about the axis of gears 14, 16 in one direction or the other depending upon the sense of rotation of input shaft 13, thus causing shafting 19, pinion 20, gear 21 and arm 22 to swing about its center. When this happens, one of the two ropes 27, 28 will be tightened on the drum 29 and the other loosened. Assuming counterclockwise rotation of arm 22, rope 27 will be tightened about the drum and pull the end of this rope connected to arm 24 to the left and thus effect a corresponding counterclockwise motion of arm 24. Clockwise rotation of arm 22 will tighten rope 28 and effect a corresponding clockwise rotation of arm 24.

Rotation of arm 24 is then transmitted through gears 26, 33, shafting 34 and gears 35, 36 to yoke 37 causing the latter to shift axle 8 and hence friction disc 5 in one direction or the other causing the latter to apply an increasing pressure against driving disc 1 or 2. Axle 8 and output shaft 9 coupled to the load will now begin to rotate and continue to pick up speed as the clutching pressure between the driving and friction discs increases with increased angular displacement of the cage of differential 15. The follow-up shaft 11 rotates at the same speed as output shaft 9, and the arrangement is such that shaft 11 causes crown gear 16 of the differential 15 to rotate in the direction opposite to that in which the other crown gear 14 is then turning. When output shaft 9 and hence shaft 11 reach an angular speed $a_2$ matching the angular speed $a_1$ of the torque input shaft 13, crown gears 14, 16 will then be rotating at the same speed but in opposite directions; hence the cage of differential 15 will now be stopped which also stops rotation $\psi$ of shaft 19, arms 22, 24 and yoke shifter 37.

If now the speed of the input shaft 13, is increased, the same sequence of events will be repeated causing a further displacement of the differential cage which increases the pressure of the friction disc 5 on the driving disc thereby progressively decreasing the slip therebetween until the output shaft 9 again matches the new speed of input shaft 13.

If input shaft 13 is rotated in the opposite direction, the friction disc 5 will of course be coupled to the other driving disc causing the output shaft 9 to rotate in the opposite direction.

The use of the clasp type torque amplifier interposed in the control intermediate the output of differential 15 and the shifting device 37 for friction disc 5, which is the improvement over the conventional arrangement illustrated in Fig. 1, is of great advantage since it enables a very large torque output to be accurately controlled from a very small torque input.

Another feature of the invention includes an arrangement for varying the speed of the driving discs 1, 2 in accordance with the speed to be imparted to the output shaft. The speed of the driving discs must always of course be greater than the speed of the power output shaft since an increase in speed of the latter is obtained by decreasing the slip between the driving disc and friction disc constituting the slip type clutch. However, there is no need for turning the driving discs at a constant and too high a speed in relation to that of the power output shaft for this only leads to unnecessary losses in power through friction and windage. Accordingly, if the speed of the driving discs is automatically varied in the same sense as variations in speed of the output shaft, the former can always be rotated at a speed which is only slightly greater than that of the power output shaft.

Referring now to Fig. 3, the torque amplifier system there illustrated is similar to the one shown in Fig. 2 with the exception, however, of a modification in the power input to the driving discs 1, 2 which permits the speed of the latter to be varied. 40 designates a motor run at a constant speed and which also drives a fly wheel 41 that serves to store energy which is available to take care of sudden shock loads on the power output shaft. The flywheel shaft 42 serves as the power input to a variable speed transmission 43 preferably hydraulic and of the continuously variable type. Transmission 43 is of conventional construction and has accordingly been illustrated in "block" form only to simplify the drawings. The output from transmission 43 is then applied over shafting 44 to rotate the driving discs. To further simplify the drawings, the operating components identical to those of Fig. 2, excluding motor 3 which is of course replaced with motor 40 have either been designated by identical reference numbers or have been illustrated as being included within the block 39 which designates the clasp type torque amplifier.

As with the arrangement shown in Fig. 2 the speed of the power output shaft 9' is varied in accordance with speed changes at the input shaft 13'. To adjust the speed of the driving discs, a control device 45 responsive to speed is driven from the output shaft 9'. The speed responsive device 45 is preferably of the centrifugal type and can be of the well known ball type in which a change in speed of the driving shaft 9' produces a corresponding axial shift in the position of a control shaft 47 that in turn is used to effect a corresponding change in the speed transmission ratio of the hydraulic variable speed transmission 43. Thus in the event of an increase in speed of output shaft 9', the corresponding change effected in the position of control shaft 47 will bring about an increase in the speed transmission ratio of transmission 43 and cause the driving discs to rotate at an increased speed, and vice versa. If the angular speed of shaft 44 at the output of transmission 43 is represented by $\omega_1$, and the speed of the torque amplifier output shaft 9' by $\omega_2$, the magnitude of the change in speed of the driving discs for a given change in speed of output shaft 9' can be made to conform to the equation $$\omega_1 - \omega_2 \cong a \text{ constant}$$

If an electric motor is used for turning the driving discs of the torque amplifier, the desired change in speed of the discs in accordance with changes in speed of the power output shaft from the amplifier can be effected without interposing a variable speed transmission unit in the shaft system.

A simple method is for instance to connect the driving shaft of the amplifier with a mechanical rectifier, the output shaft of which shows always the absolute speed of the amplifier shaft by constant turning sense. The output of the rectifier and shaft of the driving motor are connected by way of differential gearing. Now the driving motor is regulated in this way, that the speed of the differential rotor remains constant, so that the driving motor always has a higher speed than that of the amplifier shaft according to the absolute speed difference desired. With the electric motor, this is easily accomplished by means of a centrifugally responsive switch running on the shaft of the differential rotor, the contact of the switch lying in the current circuit to the driving motor. The motor is influenced in this way, that the control contact opens in trespassing the critical speed and thereby cuts the current circuit to the motor, and closes again when the critical speed is not reached. In the case of large motors, it is more practical to control their current indirectly by means of relays of thyratrons which are controlled in accordance with the output of the centrifugal switch.

This will be explained to better advantage by Figs. 8 and 9, wherein parts identical to parts of Fig. 3 have been designated with identical reference numbers. In Fig. 8, which illustrates another improved arrangement for automatically varying the speed of the driving elements of a torque amplifier in a diagrammatic view, motor 3 drives clutch discs 1 and 2 through a suitable pinion 4. The output shaft 9 is rotated synchronously with the input shaft 13 by means of the clutching disc 5 which is operated as described above, by a clasp type torque amplifier 39 in dependence upon the axial displacement of shafts 9 and 13. Current is supplied to motor 3 from mains supply to terminals 100, the supply circuit including a centrifugal switch 101. Centrifugal switch 101 comprises a contact 102, a contact arm 103 and a coil spring 104. The centrifugal switch is mounted on the output shaft 105 of a differential 106, the two input shafts 107 and 108 are coupled to motor 3 and a mechanical rectifier 109, respectively. The input shaft 110 of mechanical rectifier 109, which will be explained below with reference to Fig. 9, is connected to output shaft 9.

Fig. 9 is a perspective representation of the mechanical rectifier 109 shown in Fig. 8. A bevel gear 115 is mounted on input shaft 110, which meshes with bevel gears 116 and 117. Bevel gears 116 and 117 are journaled on shaft 108 and support each pawl 118 and 119 suitably pivoted thereon, respectively. Pawls 118 and 119 mesh with a ratchet wheel 120 fixedly mounted on shaft 108.

The mechanical rectifier operates in the following manner: Input shaft 110 is connected to output shaft 9 and will consequently be rotated in either direction. If it is rotated clockwise as indicated by arrow 121, bevel gear 117 will rotate in the sense of arrow 123, and bevel gear 116 will rotate in the inverse sense. Consequently pawl 119 will engage ratchet wheel 120 and rotate ratchet wheel 120 and output shaft 108 in the sense of arrow 123, whereas pawl 118 will not be able to impart a torque to ratchet wheel 120. If, one the contrary, shaft 110 is rotated counterclockwise, as indicated by arrow 122, the reverse effect will occur, i. e. now pawl 118 will engage ratchet wheel 120. In both cases, however, ratchet wheel 120 and output shaft 108 will be rotated in the direction of arrow 123. It is evident that the output shaft 108 of the device will be rotated with a speed equal to the absolute value of the speed of rotation of shaft 110, but always in the direction of arrow 123 and thus may be designated as a mechanical rectifier.

The embodiment of Fig. 8 will now operate as follows:

The first input shaft 107 of differential 106 is rotated at the speed of motor 3 and its second input shaft 108 is rotated at the speed of output shaft 9, but, due to the effect of mechanical rectifier 109, always in the same direction. The output shaft 105 will consequently drive the centrifugal switch at a speed corresponding to the difference of the absolute values of the speed of the motor 3 and output shaft 9, i. e. equal to the value $\omega_1 - \omega_2$. The centrifugal switch will now interrupt the supply circuit of motor 3 whenever a certain critical speed of rotation is exceeded, which may be adjusted by suitably counterbalancing the centrifugal force exerted on contact arm 103 and the force of coil spring 104. If the speed of motor 3 exceeds the speed of output shaft 9 by this critical value the current will be interrupted and the speed of the motor will decrease. Thereby a speed of rotation of the motor will continuously be sustained exceeding the speed of the output shaft 9 by an amount equal to the critical speed of the centrifugal switch. Thereby the desired variation of the motor speed in correspondence to the speed of the output shaft is effected and loss of energy within the friction clutch is avoided.

In the torque amplifiers which have been described, a change in speed at the low torque input shaft brings about a corresponding change in speed of the high torque output shaft but the response of the latter to speed changes in the input shaft is not instantaneous since the control for bringing about a speed change in the output shaft relies upon a first order difference between the two shaft speeds, i. e. $(a_1-a_2)$ to bring about the necessary speed correction. Consequently there is always a slight delay in the response of the output shaft and the latter when it does finally match the new speed of the input shaft tends to overshoot which then sets up a control quantity of the opposite sense causing the output shaft to decrease its speed. The effect is cyclic with the result that the output shaft of the amplifier tends to "hunt" considerably above and below the speed of the input shaft. The more rapid are the changes in speed at the input shaft, the worse becomes the hunting effect.

In accordance with a further feature of this invention, the undesirable hunting effect in the torque amplifier is reduced materially by superimposing upon the principal control which varies with the difference between the input and output shaft speeds $(a_1-a_2)$ an auxiliary control which varies with the first derivative of the instantaneous speed difference. Thus, if $$(a_1-a_2) = \psi$$

then the auxiliary control to be superimposed will vary as $$\frac{d\psi}{dt}$$

One practical arrangement for introducing the derivative factor is shown by Fig. 4. Here the component parts some of which are shown in block schematic form to simplify illustration, include the torque amplifier 51, driving the follow-up shaft 52 and torque output shaft 53 (turning at some instantaneous speed $a_2$), the low torque input 54 (turning at instantaneous speed $a_1$), a differential 55 driven by shafts 52 and 54 and which delivers an output from the cage to shaft 56 proportional to $\psi$, and a clasping type amplifier 57 whose input is furnished by rotation of shaft 56. The components so far described are identical with corresponding elements shown in Fig. 2. However, instead of applying the output from the clasping type amplifier 57 directly to the yoke shifter for the friction clutches as is done in Fig. 2, the output (an amplified $\psi$) is applied via shafting 58 to derivator unit 59, which functions to convert the speed difference $\psi$ into an output equal to $$k\left(\frac{d\psi}{dt}\right)$$

The derivator 59 is preferably of the fluid-mechanical type (although it may be electrical), and its output $$k\left(\frac{d\psi}{dt}\right)$$

is then delivered over shaft 60 to the cage gear of another differential gearing unit 61. The output $\psi$ from the cage of differential 55 is also supplied by way of shaft 62 and serves as the second input to one crown gear of differential unit 61. The latter thus mechanically adds its two inputs $\psi$ and $$k\left(\frac{d\psi}{dt}\right)$$

and the sum of the two, taken out over the other crown gear is supplied via shafting 63 to the input of a second clasping type amplifier 64. The output of the latter is then supplied over shafting 65 to the yoke shifting mechanism in the torque amplifier 51.

A preferred construction for the derivator unit 59 is illustrated in Figs. 5, 6 and 7. Referring now to these views, the derivator includes a cylindrical shell 70 which is divided by a fixed partition 71 and a rotor 72 having a cylindrical hub 73 and radially extending vane 74 into two semi-cylindrical oil filled compartments 75, 76. A transverse port 77 in the partition 71 interconnects the two compartments 75, 76 and hence any relative rotation between shell 70 and rotor 72 will of course cause a transfer of oil 78 from one of the compartments to the other through port 77.

For controlling the size of port 77, a plug type valve member 79 is used, the latter being slidable in a bore 80 in partition 71 arranged perpendicular to and communicating with the port 77. The position of valve 79 with respect to the port 77 is preferably regulated in accordance with temperature and for such purpose a bimetallic strip 81 is used, the strip being located in an oil filled compartment 82 adjacent compartments 75, 76 and connected at its upper free end to valve member 79; the lower end of strip 81 is secured rigidly to the partition 83 by means of cap screws 84.

The shell 70 includes still another oil compartment 85 adjacent compartment 82 and communicating therewith by a small port 86. The third compartment 85 is closed by a thin membrane 87.

A passageway 88 leading from the exterior of shell 70 to port 77 is used for filling compartments 75, 76, 82 and 85, it being noted that valve 79 is provided with a small opening 89 therethrough running lengthwise to permit oil to flow into compartment 82. After filling, passageway 88 is then closed by a screw type plug 90.

Shell 70 is provided with an axially extending hub 92 which is journalled in a stationary bearing pedestal 93. The shell 70 is arranged to be turned through an angle proportional to the output $\psi$ of differential 55 shown in Fig. 4 and accordingly is provided with a ring gear 94 by which it can be coupled to shafting 58 of the output of the clasping amplifier 57.

Rotor 72 likewise includes a shaft 95 which is journalled in a sleeve bearing formed by an axial bore 96 in hub 92. Shaft 95 extends beyond the end of hub 92 and terminates in a coupling for connection to shafting 60 shown in Fig. 4. Shaft 95 is also yieldingly restrained against rotation with respect to bearing pedestal 93 by means of a spiral spring 98, the inner end of the spring being secured to the shaft and the outer end to the pedestal.

If we now assume that the shell 70 be turned with a speed $$\frac{d\psi}{dt}$$

then rotor 72 will be also subjected to a turning moment $Md$ proportional to $$\frac{d\psi}{dt}$$

which can be expressed by the equation:

$$Md = \frac{\beta}{\sigma}\frac{d\psi}{dt}$$

In this equation $\beta$, the attenuation coefficient between the shell and rotor is dependent upon the size of port 77 as well as the viscosity of the oil 78 as the latter is forced by rotor vane 74 through port 77 from compartment 75 to compartment 76, or vice versa dependent upon the sense of rotation of shell 70; and $\sigma$ is the stiffness coefficient of spring 98 which of course opposes any motion of rotor 72.

Assuming $\beta$ and $\sigma$ to remain constant (their quotient can then be expressed by $k$), it will be evident that the absolute angular displacement $\delta$ of rotor 72 is expressed by the equation $$\delta = k\frac{d\psi}{dt}$$

Thus, the higher the speed of the input shaft 54 (in Fig. 4), the greater will be the angular displacement of rotor 72 and hence also the displacement of shaft 60 which feeds into differential 61 which thus adds the derivative factor $$k\frac{d\psi}{dt}$$

to the first order speed difference $\psi$ as previously explained.

As the oil in the various compartments of the derivator unit 59 changes in viscosity with changes in temperature, the attenuation coefficient between shell 70 and rotor 72 would likewise suffer a change and introduce an error into the output of the deviator variable with temperature. To prevent this error from arising is the function of valve 79 and its bimetallic actuator 81. Should the temperature depart from that for which the derivator unit has been calibrated, bimetal strip 81 will move valve 79 in or out dependent upon the sense of the temperature change to either reduce or increase the effective cross section of port 77. If the temperature increases, which causes a decrease in viscosity, valve 79 moves more into the port 77 (to the left as viewed in Fig. 6) and reduces the cross section effective for oil transfer between compartments 75, 76. Conversely, if the temperature decreases, valve 79 will move to the right thus increasing the port area.

Thus the valve 79 and the associated bimetal strip 81 act as a compensator to maintain $\beta$ constant for variations in temperature.

The membrane 87 closing compartment 85 being flexible is used to accommodate changes in volume of the oil filling 78 occasioned by changes in temperature.

In conclusion, it is to be understood that while preferred constructional embodiments have been illustrated and described, various changes in the construction and arrangement of parts may be made without departing from the spirit and scope of the invention as expressed by the appended claims.

We claim:

1. In a torque amplifier of the mechanical type, a motor, a pair of clutches of the friction element type, means connecting the driving element of each clutch to said motor, a high torque output shaft coupled to the driven element of each clutch, the torque between the driving and driven clutch elements being variable with the coupling pressure therebetween, a low torque input shaft, and means responsive to the angular deviation between said input and output shafts for alternatively coupling one or the other of said driven clutch elements to its associated driving element, the sense of said angular deviation determining selection of the particular driven clutch element coupled and the speed of said input shaft determining the clutch coupling pressure, last said means including a clasping type torque amplifier.

2. In a torque amplifier of the mechanical type, a motor, a pair of clutches of the friction element type, means connecting the driving element of each clutch to said motor, a high torque output shaft and a follow-up shaft coupled to the driven element of each clutch, the torque between the driving and driven clutch elements being variable with the coupling pressure therebetween, a low torque input shaft, a differential unit, the inputs to which are constituted by said follow-up and input shafts, and means controlled by the output from said differential for coupling one or the other of said driven clutch elements to its associated driving clutch element, last said means including a torque amplifier of the clasping type.

3. In a torque amplifier of the mechanical type, a motor, a pair of clutches of the friction element type, means connecting the driving element of each clutch to said motor, a high torque output shaft coupled to the driven element of each clutch, the torque between the driving and driven clutch elements being variable with the coupling pressure therebetween, a low torque input shaft, means responsive to the angular deviation between said input and output shafts for alternatively coupling one of the other of said driven clutch elements to its associated driving element, the sense of said angular deviation determining selection of the particular driven clutch element coupled and the speed of said input shaft determining the clutch coupling pressure, and means responsive to variation in speed on one of said shafts for decreasing the speed of the driving elements of said clutches upon a decrease in shaft speed and vice versa.

4. In a torque amplifier of the mechanical type, a motor, a pair of clutches of the friction element type, means including a variable speed transmission unit connecting the driving element of each clutch to said motor, a high torque output shaft coupled to the driven element of each clutch, the torque between the driving and driven clutch elements being variable with the coupling pressure therebetween, a low torque input shaft, means responsive to the angular deviation between said input and output shafts for alternatively coupling one or the other of said driven clutch elements to its associated driving element, the sense of said angular deviation determining selection of the particular driven clutch element coupled and the speed of said input shaft determining the clutch coupling pressure, and means responsive to variation in speed of one of said shafts for altering the speed transmission ratio of said unit such that the speed of the driving elements of said clutches increases with an increase in shaft speed and vice versa.

5. A torque amplifier as defined in claim 4 wherein said variable speed transmission unit is of the hydraulic type.

6. In a torque amplifier of the mechanical type, a motor, a pair of clutches of the friction element type, means connecting the driving element of each clutch to said motor, a high torque output shaft coupled to the driven element of each clutch, the torque between the driving and driven clutch elements being variable with the coupling pressure therebetween, a low torque input shaft, and means responsive to the angular deviation between said input and output shafts for alternatively coupling one or the other of said driven clutch elements to its associated driving element, the sense of said angular deviation determining selection of the particular driven clutch element coupled and the speed of said input shaft determining the clutch coupling pressure, and means responsive to variation in speed of one of said shafts for altering the speed of said motor such that the motor speed increases with an increase in shaft speed and vice versa.

7. A torque amplifier as defined in claim 6 wherein said means for altering the motor speed includes a centrifugal responsive device, whereby the device is driven by differential gearing, which is switched in between the shaft of the driving motor and the output shaft, in switching in a mechanical rectifier between the differential gearing and the output shaft.

8. A torque amplifier as defined in claim 6 wherein said motor is of the electric type and said means for altering the speed of the motor includes a centrifugal switch, in switching in between a relay.

9. A torque amplifier as defined in claim 6 wherein said means for altering the motor speed includes differential gearing between the motor shaft and the driving clutches, in switching in between a mechanical rectifier combined with a regulation organ which controls the speed of the motor in a way that the speed of the differential rotor remains constant.

10. In a torque amplifier of the mechanical type, a motor, a pair of clutches of the friction element type, means connecting the driving element of each clutch to said motor, a high torque output shaft coupled to the driven element of each clutch, the torque between the driving and driven clutch elements being variable with the coupling pressure therebetween, a low torque input shaft, and means responsive to the instantaneous angular deviation between said input and output shafts combined with the derivative of said deviation for alternatively coupling one or the other of said driven clutch elements to its associated driving element, the sense of said angular deviation determining selection of the particular driven clutch element coupled and the speed of said input shaft determining the clutch coupling pressure.

11. In a torque amplifier of the mechanical type, a motor, a pair of clutches of the friction element type, means connecting the driving element of each clutch to said motor, a high torque output shaft and a follow-up shaft coupled to the driven element of each clutch, the torque between the driving and driven clutch elements being variable with the coupling pressure therebetween, a low torque input shaft, a first differential the inputs to which are constituted by said follow-up and input shafts, a derivator unit for obtaining the derivative of the instantaneous angular difference between said input and output shafts, said unit comprising an oil filled cylindrical shell arranged to be rotated by the output of said differential, a yieldingly restrained vaned rotor within said shell and which together with a shell partition member provided with a port therethrough divide the shell interior into a pair of substantially semi-cylindrical compartments interconnected by said port, a second differential combining the output of said first differential and the output of said derivator unit as measured by the angle of rotation of said rotor, and means controlled by the output of said second differential for coupling one or the other of said driven clutch elements to its associated driving clutch element.

12. A torque amplifier as defined in claim 11 and which further includes a valve member for controlling the effective area of said port, and means responsive to temperature of the oil in said compartments for adjusting the position of said valve member to reduce the area of the port with an increase in oil temperature and vice versa.

EDGAR GRETENER.
KURT EHRAT.

REFERENCES CITED

The following references are of record in the file of this patent:

UNITED STATES PATENTS

| Number | Name | Date |
| --- | --- | --- |
| 2,173,656 | Newell | Sept. 19, 1939 |
| 2,311,010 | Vickers | Feb. 16, 1943 |

FOREIGN PATENTS

| Number | Country | Date |
| --- | --- | --- |
| 593,802 | France | June 6, 1925 |